US008711249B2

(12) United States Patent
Baqai et al.

(10) Patent No.: US 8,711,249 B2
(45) Date of Patent: Apr. 29, 2014

(54) METHOD OF AND APPARATUS FOR IMAGE DENOISING

(75) Inventors: Farhan A. Baqai, Fremont, CA (US); Akira Matsui, Kanagawa (JP); Kenichi Nishio, Yokohama (JP)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1377 days.

(21) Appl. No.: 11/731,542

(22) Filed: Mar. 29, 2007

(65) Prior Publication Data

US 2008/0239094 A1   Oct. 2, 2008

(51) Int. Cl.
  *H04N 5/21*   (2006.01)
(52) U.S. Cl.
  USPC .................... 348/241; 702/191; 702/193
(58) Field of Classification Search
  None
  See application file for complete search history.

(56) References Cited

U.S. PATENT DOCUMENTS

| | | | |
|---|---|---|---|
| 3,971,065 A | 7/1976 | Bayer | 358/41 |
| 4,142,071 A | 2/1979 | Croisier et al. | 179/15.55 |
| 5,012,333 A | 4/1991 | Lee et al. | |
| 6,098,038 A | 8/2000 | Hermansky et al. | |
| 6,148,103 A | 11/2000 | Nenonen | |
| 6,226,321 B1 | 5/2001 | Michels et al. | 375/227 |
| 6,377,637 B1 | 4/2002 | Berdugo | 375/346 |
| 6,480,610 B1 | 11/2002 | Fang et al. | |
| 6,691,086 B2 | 2/2004 | Lokhoff et al. | |
| 6,813,389 B1 | 11/2004 | Gindele et al. | |
| 7,072,511 B2 * | 7/2006 | Tan et al. | 382/167 |
| 7,133,824 B2 | 11/2006 | Wu et al. | |
| 7,209,567 B1 | 4/2007 | Kozel et al. | |
| 7,636,436 B2 | 12/2009 | Chen et al. | |
| 7,885,462 B2 | 2/2011 | Paik | |
| 2002/0015528 A1 | 2/2002 | Kondo et al. | 382/224 |
| 2002/0034337 A1* | 3/2002 | Shekter | 382/275 |

(Continued)

FOREIGN PATENT DOCUMENTS

| | | |
|---|---|---|
| CN | 1460323 | 12/2003 |
| CN | 1675919 A | 9/2005 |

(Continued)

OTHER PUBLICATIONS

Tanaka, et al., "Noise Reduction of Images with Multiple Subband Transforms," Oct. 24-27, 2004, 2004 International Conference on Image Processing, v. 2, p. 1209-1212.*

(Continued)

*Primary Examiner* — Twyler Haskins
*Assistant Examiner* — Dwight C Tejano
(74) *Attorney, Agent, or Firm* — Haverstock & Owens LLP

(57) ABSTRACT

An image denoising system and method of implementing the image denoising system is described herein. Noise is decomposed within each channel into frequency bands, and subband noise is propagated. Denoising is then able to occur at any node in a camera pipeline after accurately predicting noise that is signal level-dependent, frequency dependent and has inter-channel correlation. A methodology is included for estimating image noise in each color channel at a sensor output based on average image level and camera noise parameters. A scheme is implemented for detecting a peak-white image level for each color channel and predicting image level values for representative colors. Based on a noise model and camera parameters, noise levels are predicted for each color channel for each color patch and these noise levels are propagated to the denoising node. A three dimentional LUT correlates signal level to noise level. Then, a denoising threshold is adaptively controlled.

33 Claims, 4 Drawing Sheets

(56) References Cited

U.S. PATENT DOCUMENTS

| | | | |
|---|---|---|---|
| 2003/0138141 A1 | 7/2003 | Quan et al. | 382/162 |
| 2003/0152283 A1 | 8/2003 | Moriwaki | |
| 2003/0161549 A1 | 8/2003 | Lei et al. | |
| 2003/0202693 A1 | 10/2003 | Nakajima et al. | |
| 2003/0235343 A1 | 12/2003 | Kagaya | |
| 2004/0019492 A1 | 1/2004 | Tucker et al. | 704/500 |
| 2004/0212692 A1 | 10/2004 | Nakami et al. | |
| 2004/0252208 A1* | 12/2004 | Lee | 348/241 |
| 2005/0062861 A1* | 3/2005 | Hamasaki | 348/241 |
| 2005/0099515 A1* | 5/2005 | Tsuruoka | 348/241 |
| 2006/0204124 A1 | 9/2006 | Aihara | |
| 2007/0040914 A1 | 2/2007 | Katagiri et al. | |
| 2007/0104387 A1 | 5/2007 | Han et al. | |
| 2009/0021648 A1 | 1/2009 | Shin et al. | |
| 2009/0161982 A1 | 6/2009 | Tico et al. | |

FOREIGN PATENT DOCUMENTS

| | | | |
|---|---|---|---|
| JP | 5-56309 | 3/1993 | |
| JP | 07-249101 A | 9/1995 | |
| JP | 2003284084 A | 10/2003 | H04N 9/07 |
| JP | 2004-088149 A | 3/2004 | |
| JP | 2004208079 A | 7/2004 | H04N 9/07 |
| JP | 2005-509167 A | 7/2005 | G01J 3/46 |
| JP | 2005303803 A2 | 10/2005 | H04N 5/225 |
| WO | WO 01/74058 A1 | 10/2001 | H04N 5/335 |
| WO | 02/05262 A2 | 1/2002 | |
| WO | WO 03/041390 A3 | 5/2003 | H04N 5/225 |
| WO | 2005/029846 A1 | 3/2005 | |
| WO | 2007/002406 A2 | 1/2007 | |

OTHER PUBLICATIONS

Li, et al., "Efficient Quantization Noise Reduction Device for Subband Image Coding Schemes," May 9-12, 2005, 1995 International Conference on Acoustics, Speech, and Signal Processing, v. 4, p. 2209-2212.*

Jansen Maarten et al/, "Image de-noise by integer wavelet transforms and generalized cross validation", pp. 622-630, Medical Physics vol. 26 No. 4 Apr. 1, 199.

Shuxue Quan, "Evaluation and Optimal Design of Spectral Sensitivities for Digital Color Imaging", Apr. 2002, pp. 1-258, Center for Imaging Science, Rochester Institute of Technology.

Peter D. Burns, 1,2* Roy S. Bernsl, "Error Propagation Analysis in Color Measurement and Imaging", Jan. 11, 1997, pp. 280-289, Munsell Color Science Laboratory, Center for Imaging Science Rochester Institute of Technology, Rochester NY.

M. Rabbani and R. Van Metter, "Analysis of signal and noise propagation for several imaging mechanisms", J. Opt. Soc. Am A/vol. 6 No. 8/Aug. 1989, Apr. 11, 1989, pp. 1156-1164, Photographic Research Laboratories, Photographic Products Group, Eastman Kodak Company, Rochester New York.

J. Yao and I.A. Cunningham, "Parallel cascades: New ways to describe noise transfer in medical imaging systems", Jul. 23, 2001, pp. 2020-2038, AM. Assoc. Phys. Med., Ontario Canada.

Farhan A. Baqai and Jan P. Allebach "Computer-Aided Design of Clustered-Dot Color Screens Based on a Human Visual System Model", Proceedings of the IEEE, vol. 90. No. 1, Jan. 2002, pp. 104-122, West Lafayette, IN.

Farhan A. Baqai, Je-Ho Lee, A. Ufuk Agar, and Jan P. Allebach, "Digital Color Halftoning", Jan. 2005, pp. 87-96, IEEE Signal Processing Magazine.

Oded Ghitza, "Auditory Models and Human Performance in Tasks Related to Speech Coding and Speech Recognition:", IEEE Transactions on Speech and audio Processing, vol. 2 No. 1, Part II Jan. 1994, pp. 115-132.

Philippe Longere, Xuemei Zhang, Peter B. Delahunt, and David H. Brainard, "Perceptual Assessment of Demosaicing Algorithm Performance:", Proceedings of the IEEE, Vo. 90. No. 1, Jan. 2002, pp. 123-132.

B.K. Gunturk, J. Goltzbach, Y. Altunbasak, R. W. Schafer, and R.M. Mersereau, Demosaicking: Color Filter Array Interpolation in Single-Chip Digital Cameras, pp. 1-20, Texas Instruments Leadership University Program.

C. Tomasi and R. Manduchi "Bilateral Filtering for Gray and Color Images", Proceedings of the 1998 IEEE International Conference on Computer Vision, Bombay, India.

Kristin J. McLoughlin, Philip J. Bones, Senior Member IEEE, and Nico Karssemeijer, Noise Equalization for Detection of Microcalcification Clusters in Direct Digital Mammogram Images, IEEE Transactions on Medical Imaging, Vo.23.No. 3., Mar. 2004, pp. 313-320, New Zealand.

Po-Chieh Hung, Colorimetric calibration in electronic imaging devices using a look-up-table model and interpolations, Journal of Electronic Imaging 2(1), Jan. 1993, pp. 53-61, Konica Corporation Electronic Imaging Laboratories, No. 1 Sakura-machi, Hono-shi, Tokyo, 191 Japan.

Gene H. Golub, Charles F. Van Loan, "Matrix Computations", Third Addition 1996, Book, The John Hopkins University Press, Baltimore, Maryland.

Maarten Jansen, "Noise Reduction by Wavelet Thresholding", 2001, Book, Springer-Verlag New York, Inc.

Vossepoel et al., "Adaptive Histogram Equalization Using Variable Regions," 9th International Conference on Pattern Recognition, 1988, vol. 1, pp. 351-353.

Deng Xiuqin et al., "A new kind of weighted median filtering algorithm used for image Processing", IEEE Computer Science, 2008 International Symposium on Information Science and Engieering, pp. 738-743.

Wu Yifeng et al., "A Speckle Suppression Method for Sar Images Using Maximum Homogeneous Region Filter", pp. 2413-2416.

Antoni Buades et al., "A non-local algorithm for image denoising".

Larson et al., "A Visibility Matching Tome Reproduction Operator for High Dynamic Range Scenes",IEEE Transactions on Visualization and Computer Graphics, vol. 3, No. 4, Dec. 1997.

* cited by examiner

METHOD OF AND APPARATUS FOR IMAGE DENOISING

FIELD OF THE INVENTION

The present invention relates to the field of signal processing. More specifically, the present invention relates to image denoising.

BACKGROUND OF THE INVENTION

Most image denoising algorithms use a basic concept that attempts to perform two opposite goals at the same time: (i) preserve image edges (the spatially correlated high frequency component of the signal) and (ii) smooth out noise (the spatially uncorrelated high frequency component of the signal). A processing step called thresholding or coring is often used to achieve these goals. The operation smooths out the signal variability whose amplitude is smaller than a certain threshold which is considered as a border line to discriminate signal and noise. In other denoising algorithms, such as bilateral filtering, the noise-signal border is defined in a softer way using a Gaussian function to evaluate the variability of a signal within a neighborhood of a pixel. In such algorithms, an appropriate value has to be specified to determine the width of the Gaussian function, and such parameter setting is as important as in the other threshold-based denoising algorithms. If the threshold (or equivalent) in a denoising system is improperly set, the denoising effect may not be satisfactory, or may end up with too much blurred image with over-attenuated edges.

Therefore, appropriate threshold (or equivalent) setting is essential to have satisfactory image quality. It is also important to precisely know the noise amount at the node of signal path where denoising is performed.

SUMMARY OF THE INVENTION

An image denoising system and method of implementing the image denoising system is described herein. The image denoising system and method utilizes a fast accurate multichannel frequency dependent scheme for analyzing noise. Noise is decomposed within each channel into frequency bands, and sub-band noise is propagated. Denoising is then able to occur at any node in a camera pipeline after accurately predicting noise that is signal level-dependent, frequency dependent and has inter-channel correlation. A methodology is included for estimating image noise in each color channel at a sensor output based on average image level and camera noise parameters. A scheme is implemented for detecting a peak-white image level for each color channel and predicting image level values for a set of representative colors. Based on a noise model and camera parameters, noise levels are predicted for each color channel for each color patch and these noise levels are propagated to the denoising node. A three dimentional LUT correlates signal level to noise level. Then a denoising threshold is adaptively controlled.

In one aspect, a method of denoising an image comprises acquiring an image wherein the image contains noise, splitting the noise into a plurality of sub-bands of noise, determining a threshold for each sub-band of noise and filtering out the noise below the threshold for each sub-band of noise. The method further comprises acquiring one or more camera parameters. The method further comprises computing input noise matrices by incorporating the one or more camera parameters. The method further comprises propagating band-wise noise from the noise matrices. The method further comprises generating a signal-to-noise look up table to correlate signal values and noise values. The method further comprises predicting a pixel-by-pixel noise amount using the signal-to-noise look up table. The threshold is a pixel-by-pixel threshold. The noise is filtered out by the pixel-by-pixel threshold. The one or more camera parameters include at least one of amplifier gain, auto-white balancing gains, edge enhancement gain and color correction matrices parameters. The one or more parameters are available at a processor when implemented on a camera. The one or more parameters are available via header information in an image when implemented with image rendering software on a computing device. Propagating band-wise noise further includes band-splitting the input noise matrices into N sub-bands each. The steps of acquiring an image, splitting the noise and determining a threshold occur in real-time. Predicting the pixel-by-pixel noise amount further includes inputting a pixel value into the look up table, converting the input pixel value to a predicted noise amount, mapping signal value on an input signal to band-wise noise matrices using the look up table and interpolating and extrapolating band-wise noise matrices according to the signal value. The method further comprises updating the look up table when a shooting condition changes.

In another aspect, a method of denoising an image comprises acquiring one or more camera parameters, computing input noise matrices by incorporating the one or more camera parameters, propagating band-wise noise from the input noise matrices, generating a signal-to-noise look up table to correlate signal values and noise values, predicting a pixel-by-pixel noise amount using the signal-to-noise look up table, controlling a pixel-by-pixel threshold and filtering out noise in the image using the pixel-by-pixel threshold. The one or more camera parameters include at least one of amplifier gain, auto-white balancing gains, edge enhancement gain and color correction matrices parameters. The one or more parameters are available at a processor when implemented on a camera. The one or more parameters are available via header information in an image when implemented with image rendering software on a computing device. Propagating band-wise noise further includes band-splitting an input noise matrix into N sub-bands. The steps of acquiring one or more camera parameters, computing input noise matrices, propagating band-wise noise and generating a signal-to-noise look up table occur in real-time. Predicting the pixel-by-pixel noise amount further includes inputting a pixel value into the look up table, converting the input pixel value to a predicted noise amount, mapping signal value on an input signal to band-wise noise matrices using the look up table and interpolating and extrapolating band-wise noise matrices according to the signal value. The method further comprises updating the look up table when a shooting condition changes.

In yet another aspect, a system for denoising an image comprises an image processing pipeline and a noise reduction control unit coupled to the image processing pipeline, wherein the noise reduction control unit determines threshold values to reduce noise. The image processing pipeline further comprises an imager for acquiring the image, a set of imaging components coupled to the imager for processing the image, a noise reduction block coupled to the set of imaging components for reducing the noise in the image and a set of post-processing components coupled to the noise reduction block for processing the image after noise reduction. The noise reduction block splits the noise into sub-bands and utilizes thresholds received from the noise reduction control unit to filter the noise. The noise reduction control unit generates thresholds based on the sub-bands. The noise reduction control unit is implemented on a processor. The noise reduction control unit implements an imager noise model, noise propagation and predicted band-wise noise matrices to determine the threshold values.

In another aspect, a system for denoising an image comprises an image processing pipeline, wherein the image processing pipeline further comprises an imager for acquiring the image, a set of imaging components coupled to the imager for processing the image, a noise reduction block coupled to the set of imaging components for reducing the noise in the image and a set of post-processing components coupled to the noise reduction block for processing the image after noise reduction and a processor implementing a noise reduction control unit function coupled to the image processing pipeline, wherein the processor determines threshold values to reduce noise. The noise reduction block splits the noise into sub-bands and utilizes thresholds received from the noise reduction control unit to filter the noise. The processor generates thresholds based on the sub-bands. The processor implements an imager noise model, noise propagation and predicted band-wise noise matrices to determine the threshold values.

In another aspect, a method of denoising an image comprises detecting an average image level at a sensor for each color channel in a set of color channels, estimating an average noise level for each color channel in the set of color channels, predicting noise at a node where denoising is performed and controlling a threshold for denoising.

In another aspect, a method of denoising an image comprises detecting a peak-white image level at an image sensor for each color channel in a set of color channels, predicting image levels for a set of representative colors, computing a noise level of each color patch and each color channel, predicting noise at a node where denoising is performed, generating a three dimensional look up table to correlate signal level to noise level and adaptively controlling a threshold setting for denoising.

DETAILED DESCRIPTION OF THE PREFERRED EMBODIMENT

In most practical denoising system implementations and designs, parameter tuning has heavily relied on a trial-and-error approach, being based on subjective evaluation by a designer which is time-consuming and depends on personal preference of the designer.

Generally image noise at a sensor output is able to be assumed as white, Gaussian and spatially uncorrelated, where the standard deviation is defined as:

$$\sigma_{pixel} = \sqrt{ax^2 + bx + c} \quad (1)$$

where x is pixel intensity and a, b and c are constants specific to image sensor, analog preprocessing and analog-to-digital converter circuits. Constant a corresponds to pixel-to-pixel aperture variation, constant b to optical-shot noise and constant c to floor noise includes thermal noise, dark shot noise and pixel-to-pixel dark current variation. Constants a, b and c can be determined either by measurement or by theoretical derivation. As shown, it is relatively simple to predict a noise amount in an image at the image sensor output. However, the more the image is processed toward final output, the more complicated the noise characteristics become (FIG. 1).

Figure 1:
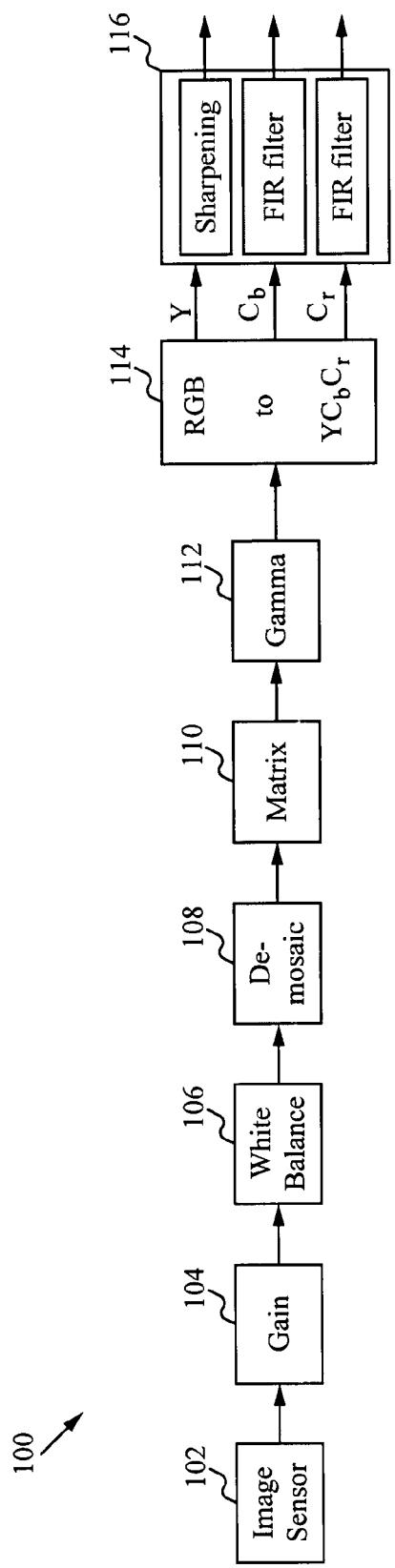
FIG. 1 illustrates a block diagram of a camera pipeline.

FIG. 1 shows a block diagram of a camera pipeline 100. An image sensor 102 sends a Gaussian, white and uncorrelated noise but has signal level dependence. The noise also has missing pixels (mosaiced). A gain component 104 produces high gain at low-light and low gain at high-light. Signal-noise behavior changes accordingly. A white balance component 106 changes gains for R, G and B depending on illumination. Furthermore, channel dependence exists after the white balance component 106. After using a demosaicing component 108 to demosaic complete RGB planes, there is frequency dependent inter-channel correlation. Specifically, G-channel high frequency noise is copied to the B and R channels, maintaining higher inter-channel correlation than at low frequency. After a matrix component 110 the inter-channel correlation is more complicated. After a gamma component 112, strong level dependence is added, and the noise is not Gaussian anymore. An RGB to YCbCr matrix 114 adds additional inter-channel dependence. A sharpening/filtering component 116 boosts Y signal high frequency and bandlimits the C signal, causing additional frequency dependence. Final camera output usually has channel wise (YCbCr), signal-level-wise and band-wise noise.

It is not a simple task to predict noise amount in, for instance, Cb channel in YCbCr color space, which is widely used for camera output image format. Usually, Cb is approximately equal to 0 at either black, white or gray patches, while noise amount differs in each patch because noise amount generally decreases as image intensity increases due to tone curve applied to image signal at gamma correction. This means that simply measuring the Cb value will not lead to precisely predicting the noise amount in a Cb signal. In addition, signal and noise in the Cb channel is usually band-limited. In order to relate the original sensor noise to Cb noise, the calculation method has to consider spatial filter operations inserted between the image sensor and YCbCr output.

To address the above-mentioned problem, measurement-based noise amount identification has been proposed and used. However, in this case, the image pipeline has to have extra circuitry to measure the noise amount within a certain size of image window, which could be a cost and size impact for the system. Furthermore, since larger window size translates to more precise noise prediction, there is a tradeoff between hardware size and precision. Also, the measurement-based noise amount identification is not always perfect because it is hard to discriminate noise from scene texture.

Some Noise Reduction (NR) theories (such as wavelet NR), provide statistical/mathematical derivation of the optimal threshold value for images with a known amount of noise. However, in most cases, these theories assume input image noise being white (noise power spectral distribution is flat over frequencies and has no frequency dependence). This assumption does not apply for noise in images that flow in a processing pipeline of real cameras (FIG. 1).

As an alternative way to estimate image noise, a fast noise propagation method is known and used to predict noise amount in an arbitrary node in an image signal processing pipeline. However, this method does not account for frequency dependence of noise, and is able to have substantial error in noise amount prediction. If higher prediction accuracy is needed, image simulation with a statistically sufficient number of pixels is performed. Then, the noise amount at the node of interest can be known by measuring the resultant image. However, this is too computationally burdensome and is not realistic to be made real-time and/or on-camera. No fast noise propagation method is available that can take noise's frequency dependence in account.

As a result, there has not existed an image denoising system in which the system itself automatically and systematically determines the appropriate threshold settings for denoising. However, an improved image denoising system and method of implementing the image denoising system is described herein.

Figure 2:
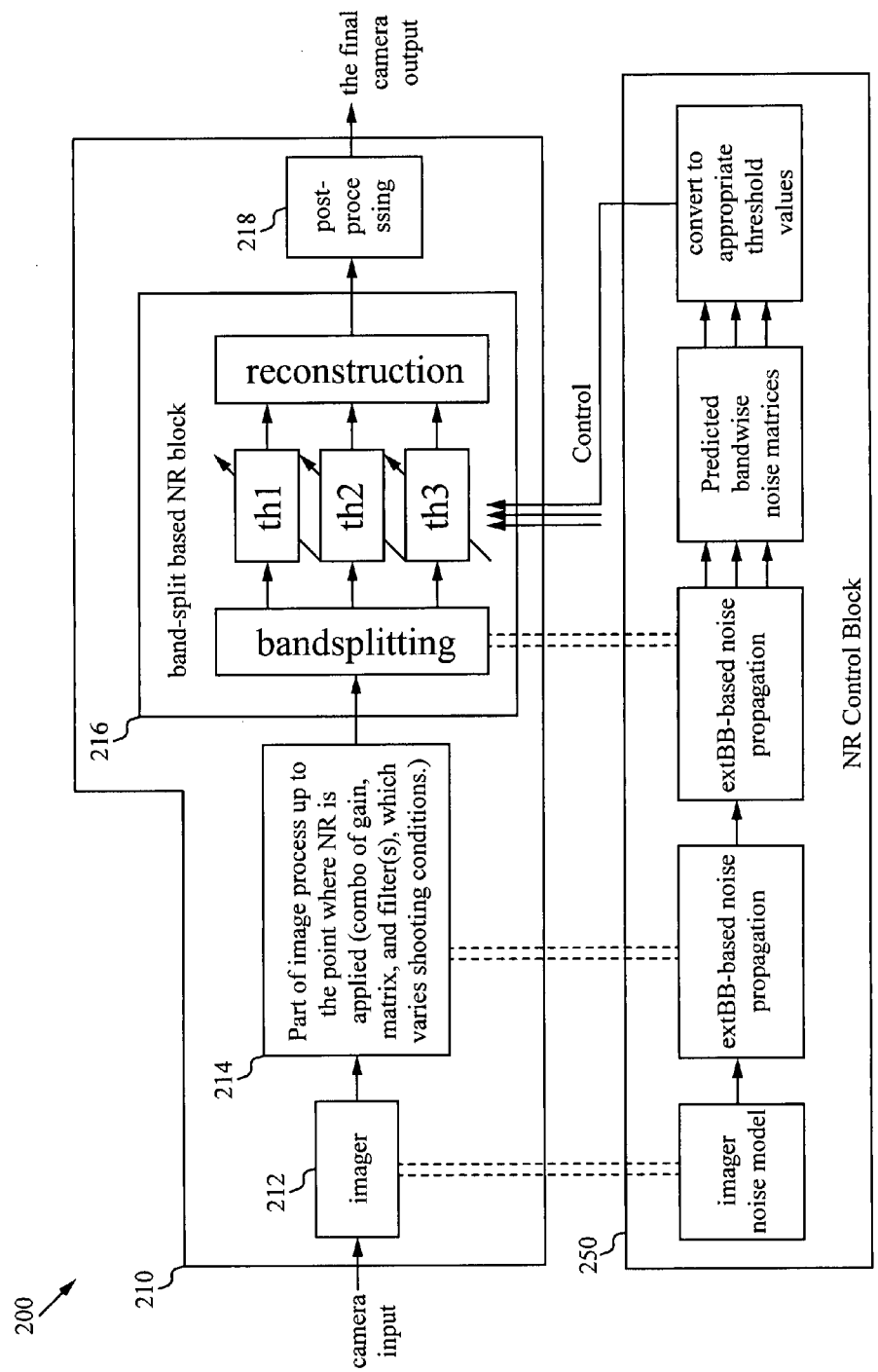
FIG. 2 illustrates a block diagram of an image denoising system.

FIG. 2 illustrates a block diagram of an image denoising system 200. The image denoising system 200 is divided into two large blocks, a main image processing pipeline 210 including a Noise Reduction (NR) block 216, and an NR control unit 250 which includes an image sensor noise model and noise propagation components.

Within the main image processing pipeline 210, an imager 212 acquires an image from the camera input such as by a user taking a picture. Imaging components 214 that perform image processing such as gain, matrix and filters which vary shooting conditions are coupled to the imager 212. The NR block 216 is coupled to the imaging components 214. The NR block 216 splits the image with noise data bands, uses thresholds to filter out the noise in each band and then reconstructs the image without the noise or at least with reduced noise. A post-processing component 218 processes the image after it is reconstructed, and ultimately, the final image is output. In some embodiments, some of the components above are implemented in software using a processor, for example, the imaging components 214, the NR block 216 and the post-processing component 218. In some embodiments the components are implemented in hardware.

Within the NR control unit 250, an imager noise model, extended Burns & Berns (BB)—based noise propagation, predicted bandwise noise matrices and threshold value conversion are implemented. Extended BB is referred to in pending U.S. patent application Ser. No. 11/731,261, entitled METHOD OF AND APPARATUS FOR ANALYZING NOISE IN A SIGNAL PROCESSING SYSTEM, incorporated herein by reference. Preferably, the NR control unit 250 is implemented on an embedded processor. The NR control unit 250 ultimately determines the thresholds for the bandwise noise so that the band-split based NR block 216 is able to filter out the noise appropriately.

Figure 3:
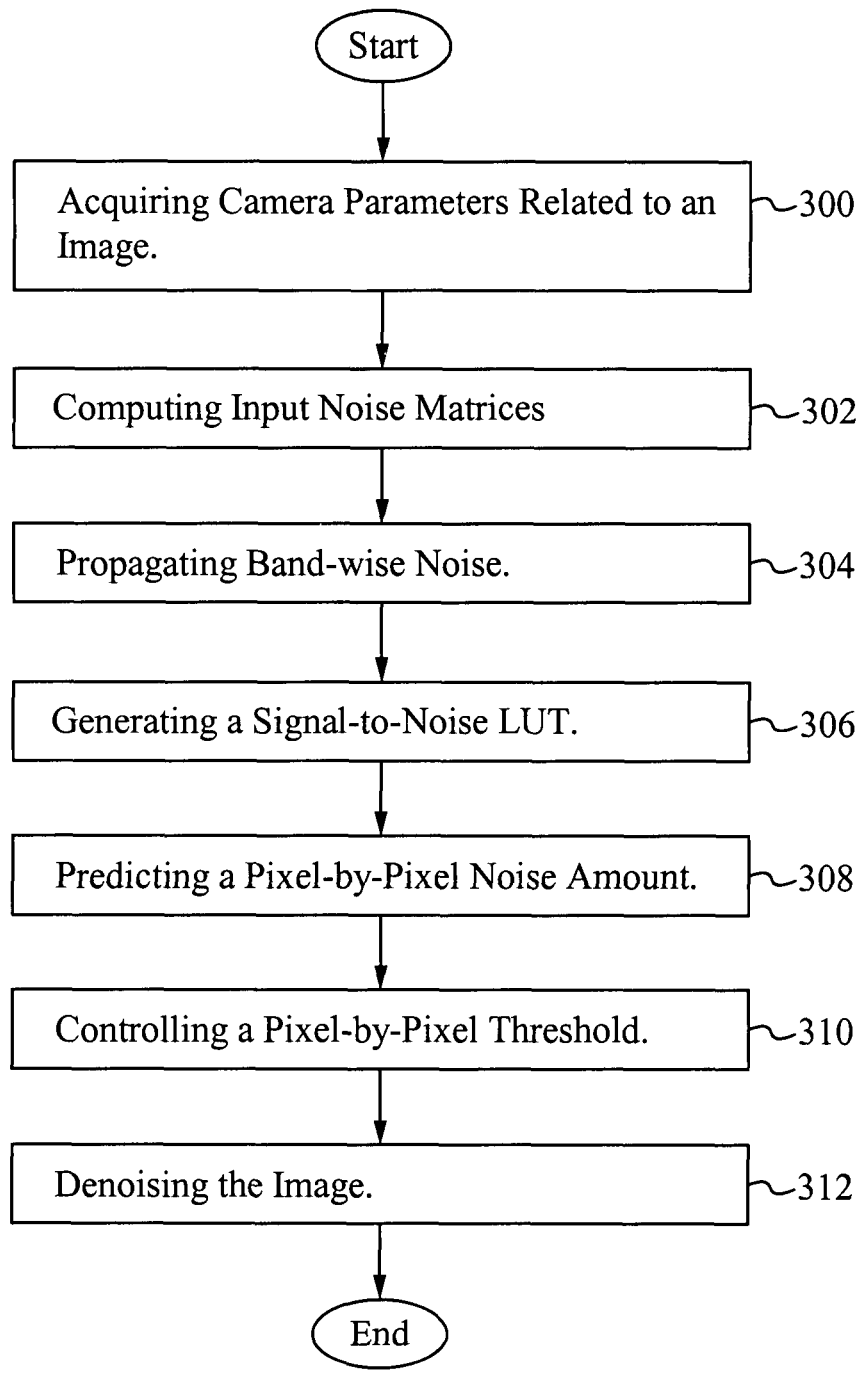
FIG. 3 illustrates a flowchart of the procedure for denoising using the image denoising system.

FIG. 3 illustrates a flowchart of the procedure for denoising using the image denoising system. In the step 300, camera parameters are acquired. This step is in order to have necessary information to calculate noise amount at a node of denoising. In real cameras, in a consumer-level digital camcorder or digital camera, for example, some image process parameters are adaptively updated depending on shooting conditions. These parameters are, for example, amplifier gain which changes depending on scene luminance, auto-white balancing gains which change depending on chromaticity of illumination, edge enhancement gain which is able to be reduced under a dark and noisy environment and color correction matrices parameters which is able to change to maintain color constancy over various illuminations. The changes in these parameters are able to significantly affect noise characteristics at the node of denoising. These parameters are preferably all taken into account. These parameters are usually available at the on-camera microprocessor and are able to be used when the image denoising system is implemented on a camera. Or, these parameters are able to also be made available via header information in recorded images and are able to be used when the image denoising system is implemented as a part of image rendering software that runs on personal computers.

In the step 302, input noise matrices are computed. In this step, the image pipeline input noise (image sensor output noise) is specified. To calculate the noise, a noise model (equation (1) and constants a, b and c) and value x in equation (1) are needed.

As explained earlier, constants a, b and c are able to be specified either by measurement or by theoretical derivation. The value x is able to be in any unit, such as electron count, voltage or digital code value while constants a, b and c should change accordingly. Some of, or all of these constants are a function of programmable amplifier gain. The value of x in digital code value is able to be readily known by monitoring pixel values that flow in the image pipeline; but in this implementation, an alternative way is taken, which is to have a set of representative values and to store the values as a signal-to-noise mapping data. First, the value x (each component in a vector, (r, g, b) for instance, in case of a primary-color camera system) in arbitrary units is calculated by integrating the element-wise product of camera, illumination and representative color patch spectral sensitivity, emission and reflectance distribution, respectively. Illumination estimation is running in general consumer cameras, thus this estimated illumination for computation is able to be used. For the representative color patch set, a Macbeth ColorChecker is often used. Next, from an auto-exposure algorithm, that is also running on-camera, information related to absolute luminance of incident light (e.g. absolute number of photoelectrons) at the image sensor is able to be known, and the value x is known in a specified unit. The input noise matrix:

$$\sum_{input} = \begin{bmatrix} \sigma_r & 0 & 0 \\ 0 & \sigma_g & 0 \\ 0 & 0 & \sigma_b \end{bmatrix} \quad (2)$$

where diagonal elements are computed by equation (1). At the input, it is able to be assumed off-diagonal elements of the noise matrix are zero because inter-pixel noise correlation is able to be considered negligibly small in most image sensors.

In the step 304, band-wise noise is propagated. The noise propagation method disclosed in pending U.S. patent application Ser. No. 11/731,261, entitled METHOD OF AND APPARATUS FOR ANALYZING NOISE IN A SIGNAL PROCESSING SYSTEM, incorporated herein by reference, is able to take into account important signal operations, linear, nonlinear and spatial transformations, that are often used in a camera signal processing pipeline and is able to precisely predict noise that propagates along the pipeline. The equation (2) is band-split into N bands. As a result, the equation (2) becomes a band-wise expression of a noise matrix, whose size is 3N×3N. Then, by applying a calculation explained in U.S. patent application Ser. No. 11/731,261, entitled METHOD OF AND APPARATUS FOR ANALYZING NOISE IN A SIGNAL PROCESSING SYSTEM, band-wise noise matrices are possible at an arbitrary signal processing node (YCbCr for example), where the denoising algorithm is applied. Noise propagation is repeated for the number of patches. In the Macbeth ColorChecker's case, for example, it is 24. Thus, there are 24 band-wise noise matrices, where N is the number of bands. At the same time, to be used in the next step, signal propagation is also performed, and a set of 24×3 signal values is stored.

In the step 306, a three dimensional signal-to-noise Look-Up Table (LUT) is generated. The three dimensional LUT is formed in order to correlate signal value and noise value. Any known method for generating a rectangular raster set from randomly scattered representative points is able to be used.

In the step 308, pixel-by-pixel noise amount prediction occurs. Preferably, this step occurs in real-time. Pixel value (YCbCr, for example) is input to the LUT, and the input pixel value is converted to a predicted noise amount. The LUT maps signal value to band-wise noise matrices. Band-wise noise matrices are interpolated or extrapolated, according to the input signal value. To avoid unnecessary fluctuation of the noise amount prediction, low-pass filters may be applied to the LUT input signal.

In the step 310, pixel-by-pixel threshold control occurs. Since the noise amount of the input pixel is accurately predicted, the denoising process is able to have appropriate threshold value control. For example, the predicted noise amount is multiplied by a factor of three, then used as the threshold value.

From the steps 300 through 306, the computation does not have to be real-time (in other words, pixel-rate calculation rate is not necessary). The LUT has to be updated only when a shooting condition (e.g. scene luminance, illumination and so on) changes. The computation amount for generating the LUT is reasonably small, thus it is possible to implement the algorithm in an embedded microprocessor in a digital camcorder or a camera, where shooting condition parameters are readily available.

The more an image is processed from an image sensor output toward the final camera output, the more complicated the noise characteristics become. To accurately predict noise amount in an image pipeline, the noise's signal level dependence, frequency dependence and inter-channel correlation have to be considered. No fast noise propagation technique has been available that is able to consider the above mentioned three noise factors at the same time. The combination of the three dimensional LUT concept and the propagation technique are able to accurately predict noise with reasonable computational resources. When this noise propagation method is applied to an imaging system with denoising, the denoising parameters are able to be appropriately set by referring to predicted noise values at the node of denoising. It enables the denoising algorithm to perform significantly better and leads to improved picture quality of digital imaging devices.

Figure 4:
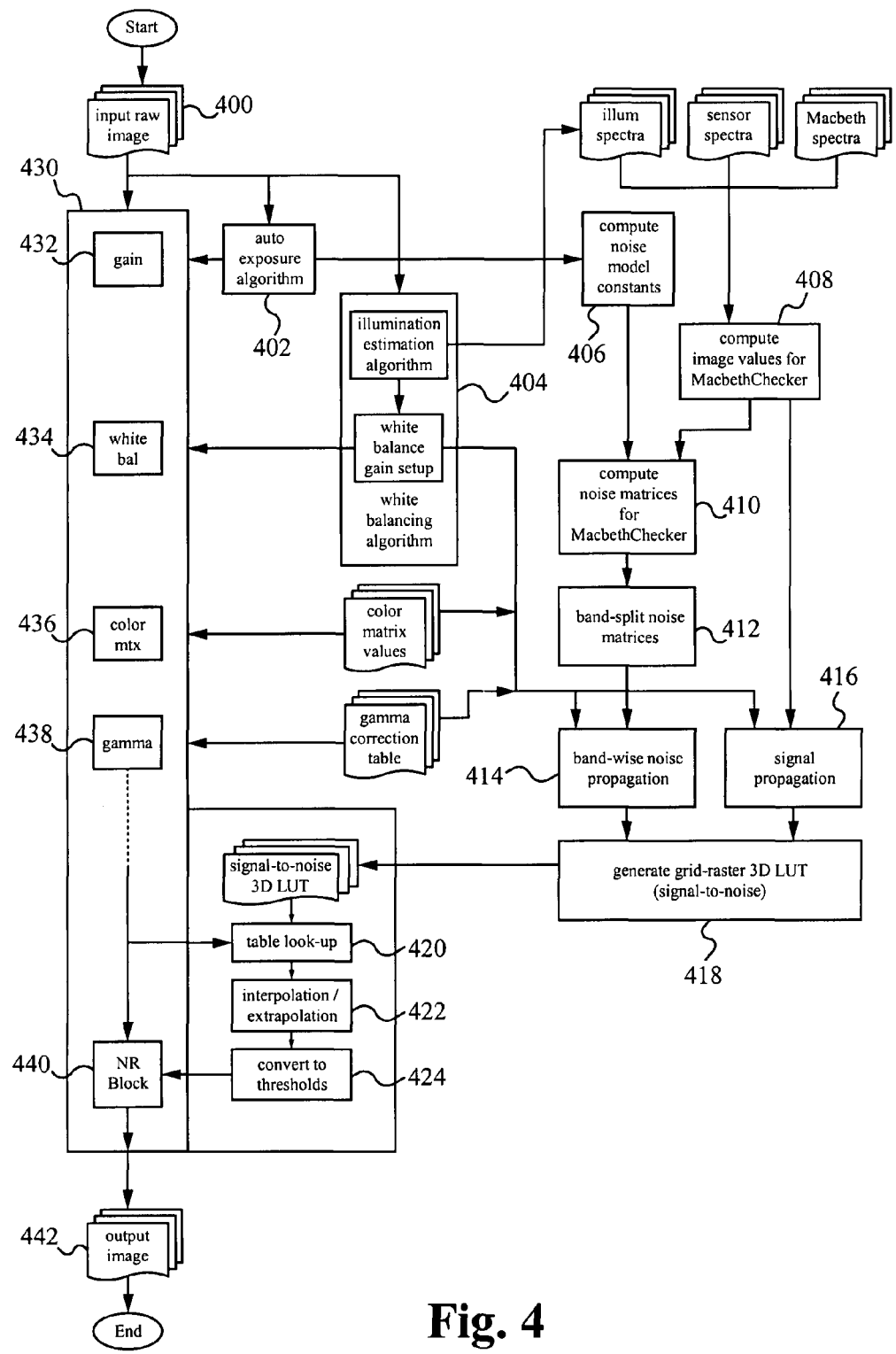
FIG. 4 illustrates a flowchart of the procedure for denoising using the image denoising system including additional steps.

FIG. 4 illustrates a flowchart of the procedure for denoising using the image denoising system including additional steps. In the step 400, raw image data is input such as by being acquired by a camera when a user takes a picture. The box 430 contains standard camera image pipeline processes such as gain 432, white balance 434, color matrix 436, gamma 438, and noise reduction 440. In parallel, camera parameters are acquired in the step 402, where an auto exposure algorithm runs and in the step 404, where a white balancing algorithm runs. Within the white balancing algorithm is an illumination estimation algorithm and a white balance gain setup. From the auto exposure algorithm, noise model constants are computed in the step 406. After the white balancing algorithm, illumination spectra, sensor spectra and Macbeth spectra go on to computing image values for a Macbeth Checker in the step 408. The noise model constants and image values from the steps 406 and 408 respectively are used to compute noise matrices for the Macbeth Checker in the step 410. In the step 412, the noise matrices are split into bands as described previously. Color matrix values and a gamma correction table are used in conjunction with the band-split noise matrices to perform band-wise noise propagation in the step 414. The color matrix values and the gamma correction table is also used with the image values for the Macbeth Checker for signal propagation in the step 416. Using the band-wise noise propagation and the signal propagation, a grid-raster 3D (signal-to-noise) LUT is generated, in the step 418. Using the signal-to-noise 3D LUT, table lookup occurs in the step 420, interpolation/extrapolation occurs in the step 422 and the data is converted into thresholds in the step 424; all three steps occur in real-time. Then using the thresholds, the noise is reduced within the image pipeline in the step 440. Ultimately, an image with reduced noise is output in the step 442.

To utilize the image denoising method and system, a user takes a picture with a digital camera or a movie with a digital camcorder. Once the image or video data is acquired, the data is processed by hardware/software components which perform standard imaging processing in addition to the denoising process described herein. The denoising process includes splitting the data including noise into bands, filtering each band whereby a threshold is used for each band and then reconstructing the data with minimized noise. After the noise is minimized or eliminated, post-processing occurs as well to produce a clear, denoised image or video.

In operation, an imaging device such as a camera or camcorder implements the required hardware and/or software for band-wise denoising. The imaging device that is properly configured automatically handles the splitting of the noise into bands, predicting and propagating the noise and ultimately minimizing or removing the noise. The result is a much less noisy image or video.

In an embodiment, an average image level is detected at a sensor for each color channel in a set of color channels. The average noise level is then estimated for each color channel. Noise is predicted at the node where denoising will be performed. The threshold of the denoising method is then able to be accurately controlled. In another embodiment, a peak-white image level is detected at the image sensor for each color channel in the set of color channels. Then, image levels for a set of representative colors are predicted. The noise level of each color patch and each color channel is computed. Noise at the node where denoising will be performed is then predicted. A 3-D look-up-table (LUT) is generated to correlate signal level to noise level. The threshold setting is then able to be adaptively controlled.

In an alternative embodiment, a pixel-by-pixel noise propagation pipeline is implemented, which works in parallel with the image pipeline.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of denoising an image programmed in a memory of a device comprising:
   a. acquiring an image wherein the image contains noise;
   b. splitting the noise into a plurality of sub-bands of noise;
   c. determining a threshold for each sub-band of noise wherein the threshold is a multiple of a predicted noise amount, wherein the predicted noise amount is determined based on a computation comprising a conversion of a pixel value using a lookup table and interpolation; and
   d. filtering out the noise below the threshold for each sub-band of noise.

2. The method as claimed in claim 1 further comprising acquiring one or more camera parameters.

3. The method as claimed in claim 2 further comprising computing input noise matrices by incorporating the one or more camera parameters.

4. The method as claimed in claim 3 further comprising propagating band-wise noise from the noise matrices.

5. The method as claimed in claim 4 further comprising generating a signal-to-noise look up table to correlate signal values and noise values.

6. The method as claimed in claim 5 further comprising predicting a pixel-by-pixel noise amount using the signal-to-noise look up table.

7. The method as claimed in claim 1 wherein the threshold is a pixel-by-pixel threshold.

8. The method as claimed in claim 7 wherein the noise is filtered out by the pixel-by-pixel threshold.

9. The method as claimed in claim 2 wherein the one or more camera parameters include at least one of amplifier gain, auto-white balancing gains, edge enhancement gain and color correction matrices parameters.

10. The method as claimed in claim 2 wherein the one or more parameters are available at a processor when implemented on a camera.

11. The method as claimed in claim 2 wherein the one or more parameters are available via header information in an image when implemented with image rendering software on a computing device.

12. The method as claimed in claim 4 wherein propagating band-wise noise further includes band-splitting the input noise matrices into N sub-bands each.

13. The method as claimed in claim 1 wherein the steps a-c occur in real-time.

14. The method as claimed in claim 6 wherein predicting the pixel-by-pixel noise amount further includes:
   a. inputting a pixel value into the look up table;
   b. converting the input pixel value to the predicted noise amount;
   c. mapping signal value on an input signal to band-wise noise matrices using the look up table; and
   d. interpolating and extrapolating band-wise noise matrices according to the signal value.

15. The method as claimed in claim 5 further comprising updating the look up table when a shooting condition changes.

16. A method of denoising an image programmed in a memory of a device comprising:
   a. acquiring one or more camera parameters;
   b. computing input noise matrices by incorporating the one or more camera parameters;
   c. propagating band-wise noise from the input noise matrices, wherein propagating the band-wise noise is repeated for a number of patches in the image;
   d. generating a signal-to-noise look up table to correlate signal values and noise values, wherein the signal-to-noise look up table is only updated when a shooting condition changes;
   e. predicting a pixel-by-pixel noise amount using the signal-to-noise look up table, wherein the predicted pixel-by-pixel noise amount is determined based on a computation;
   f. controlling a pixel-by-pixel threshold, wherein the pixel-by-pixel threshold is a multiple of the pixel-by-pixel noise amount; and
   g. filtering out noise in the image using the pixel-by-pixel threshold.

17. The method as claimed in claim 16 wherein the one or more camera parameters include at least one of amplifier gain, auto-white balancing gains, edge enhancement gain and color correction matrices parameters.

18. The method as claimed in claim 16 wherein the one or more parameters are available at a processor when implemented on a camera.

19. The method as claimed in claim 16 wherein the one or more parameters are available via header information in an image when implemented with image rendering software on a computing device.

20. The method as claimed in claim 16 wherein propagating band-wise noise further includes band-splitting an input noise matrix into N sub-bands.

21. The method as claimed in claim 16 wherein the steps a-d occur in real-time.

22. The method as claimed in claim 16 wherein predicting the pixel-by-pixel noise amount further includes:
   a. inputting a pixel value into the look up table;
   b. converting the input pixel value to a predicted noise amount;
   c. mapping signal value on an input signal to band-wise noise matrices using the look up table; and
   d. interpolating and extrapolating band-wise noise matrices according to the signal value.

23. The method as claimed in claim 16 further comprising updating the look up table when a shooting condition changes.

24. A system for denoising an image comprising:
   a. an image processing pipeline comprising a noise reduction block coupled to the set of imaging components for reducing noise in the image, wherein the noise reduction block splits the noise into sub-bands and utilizes thresholds received from the noise reduction control unit to filter the noise; and
   b. a noise reduction control unit coupled to the image processing pipeline, wherein the noise reduction control unit determines threshold values based on a multiple of a predicted noise amount to reduce the noise, wherein the predicted noise amount is determined based on a computation comprising a conversion of a pixel value using a lookup table and interpolation.

25. The system as claimed in claim 24 wherein the image processing pipeline further comprises:
   a. an imager for acquiring the image;
   b. a set of imaging components coupled to the imager for processing the image; and
   c. a set of post-processing components coupled to the noise reduction block for processing the image after noise reduction.

26. The system as claimed in claim 24 wherein the noise reduction control unit generates the thresholds based on the sub-bands.

27. The system as claimed in claim 24 wherein the noise reduction control unit is implemented on a processor.

28. The system as claimed in claim 24 wherein the noise reduction control unit implements an imager noise model, noise propagation and predicted band-wise noise matrices to determine the threshold values.

29. A system for denoising an image comprising:
   a. an image processing pipeline, wherein the image processing pipeline further comprises:
      i. an imager for acquiring the image;
      ii. a set of imaging components coupled to the imager for processing the image;
      iii. a noise reduction block coupled to the set of imaging components for reducing the noise in the image; and iv. a set of post-processing components coupled to the noise reduction block for processing the image after noise reduction; and b. a processor implementing a noise reduction control unit function coupled to the image processing pipeline, wherein the processor determines threshold values to reduce noise wherein the threshold values are multiples of predicted noise amounts, wherein the noise reduction block splits the noise into sub-bands and utilizes thresholds received from the noise reduction control unit to filter the noise, wherein a three dimensional signal-to-noise lookup table is used to correlate signal value and noise value, wherein the predicted noise amounts are determined based on a computation comprising a conversion of a pixel value using the three dimensional signal-to-noise lookup table and interpolation.

30. The system as claimed in claim 29 wherein the processor generates thresholds based on the sub-bands.

31. The system as claimed in claim 29 wherein the processor implements an imager noise model, noise propagation and predicted band-wise noise matrices to determine the threshold values.

32. A method of denoising an image comprising:
a. detecting an average image level at a sensor for each color channel in a set of color channels;
b. estimating an average noise level for each color channel in the set of color channels;
c. predicting noise at a node where denoising is performed; and
d. controlling an adaptive threshold for denoising, wherein the threshold is a multiple of a predicted noise amount, wherein the predicted noise amount is determined based on a computation comprising a conversion of a pixel value using a lookup table and interpolation.

33. A method of denoising an image comprising:
a. detecting an average image level at an image sensor for each color channel in a set of color channels;
b. predicting image levels for a set of representative colors;
c. computing a noise level of each color patch and each color channel;
d. predicting noise at a node where denoising is performed;
e. generating a three dimensional look up table to correlate signal level to noise level; and
f. adaptively controlling a threshold setting for denoising, wherein the threshold is a multiple of a predicted noise amount, wherein the predicted noise amount is determined based on a computation comprising a conversion of a pixel value using a lookup table and interpolation.

* * * * *